March 18, 1941.    S. JENCICK    2,235,430
STARTING PINION
Filed July 20, 1938
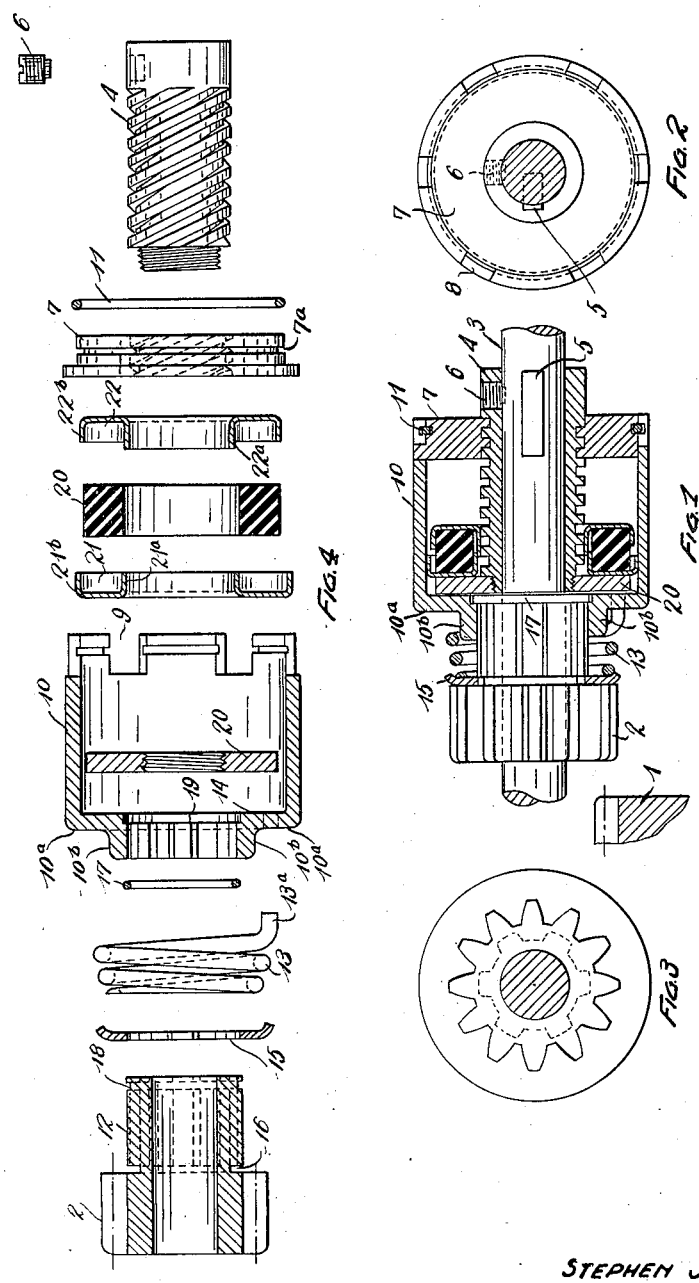
INVENTOR.
STEPHEN JENCICK
BY Milburn & Milburn
ATTORNEYS.

Patented Mar. 18, 1941

2,235,430

UNITED STATES PATENT OFFICE 2,235,430

STARTING PINION

Stephen Jencick, Chagrin Falls, Ohio

Application July 20, 1938, Serial No. 220,249

4 Claims. (Cl. 74—7)

This invention relates to an improved form of device for starting internal combustion motors.

The present device is of the type in which the starting pinion is moved axially into mesh with the gear of the engine which is to be started.

The object of the present invention is to provide such a device which comprises comparatively few parts and in which the parts are assembled in a simple manner, and which therefore can be manufactured at comparatively low cost.

Another object consists in providing such a device which is at the same time extremely dependable, quiet, and is subject to minimum wear between the parts.

A further object is to provide a device in which there is a yieldable manner of engagement of the starting pinion with the gear of the engine so as to preclude clashing of the teeth of the pinion with those of the gear and to permit the teeth of the pinion to smoothly find their way into proper meshing engagement with those of the gear.

A still further object is to devise such a structure in which the operating connection comprises a screw and nut mechanism within a completely closed casing which encloses also a cushioning means for preventing clashing of the nut member as it reaches its limit of movement.

And it is also an object to devise such an operating mechanism in which the casing and nut member are comparatively heavy with respect to the screw member so as to ensure straight-line engagement along the screw without objectionable rotation of the pinion as might otherwise occur during operation of the starting motor.

Other objects will appear from the following description and claims when considered together with the accompanying drawing.

Fig. 1 is a longitudinal sectional view of my improved form of device in assembly;

Fig. 2 is an end view thereof;

Fig. 3 is a view of the opposite end thereof; and

Fig. 4 is a distended view of the entire mechanism.

It is to be understood that the present disclosure is merely for purposes of illustration and that there may be devised various modifications without departing from the spirit of the invention as herein set forth and claimed.

According to the present type of device, the gear 1 of the internal combustion engine which is to be started, is adapted to be engaged by the pinion 2 which is capable of being moved axially for this purpose.

The mechanism for effecting such axial movement of the starting pinion, is operated as usual by an electric motor which is adapted to rotate the shaft 3. Upon the shaft 3 there is provided the screw member 4 which is attached thereto by means of a key 5 and set screw 6. The screw 4 is engaged by the nut member 7 which has radially extending projections 8 seating in the cut-out portions 9 of the end of the casing 10. Thus, the nut member closes the one end of the casing 10 and is secured in such engagement therewith by means of the split spring ring 11 which seats in companion annular grooves in the nut member and the casing, as indicated in Fig. 1. The groove in the nut member is indicated by reference numeral 7a. Thus, this end of the casing is completely closed.

At the other end of the casing there is an inwardly extending wall 10a which terminates in a hub portion 10b extending co-axially with the shaft 3. The hub portion 10b has spline connection with the correspondingly formed hub 12 of the pinion 2. Interposed between the adjacent ends of the casing and pinion and surrounding the spline connection, is the coil spring 13 which has its one end 13a anchored in the aperture 14 in the end wall 10a of the casing, while its other end abuts the annular seat member 15 positioned in the groove 16 at the junction between the pinion 2 and the hub 12.

The hub 12 is maintained in assembly with its companion casing member by means of the spring split ring 17 which seats in the annular groove 18 of the hub 12 and engages the annular shoulder 19 within the end portion of the casing. The pinion 2 and its hub 12 also have bearing support upon the end portion of the shaft 3 which extends therethrough to a suitable bearing.

The annular disk 20 is screw-threaded upon the one end of the screw member 4 and serves as an abutment for a cushioning means within the casing 10. This means comprises the ring form of rubber or other like material which is seated within the companion telescoping flanged ring seats 21 and 22. The central extended annular flange 22a of the one member extends within the corresponding flange 21a of the companion member 21. Likewise, the outer flanges 21b and 22b overlap each other. Thus there is permitted relative movement between these ring members 21 and 22 so as to permit compression of the rubber ring therewithin. These ring members surround the screw member 4 and this cushioning means is adapted to be engaged by the nut member 7, thereby preventing any clashing which might otherwise occur.

By virtue of the particular construction of the casing and nut member and the screw member and their particular manner of engagement with each other, the casing and nut together with the pinion are comparatively heavy with respect to the screw member, and the result is that the action of the device is extremely positive and definite, according to the rotation of the shaft 3. The straight-line movement of the casing and hence that of the pinion will correspond to that of the shaft 3 without objectionable rotation or over-running as would otherwise occur. Thus, the pinion will be fed along the rotating screw so as to permit the teeth of the pinion to mesh with those of the motor gear without clashing. Furthermore, this quiet, straight-line advancing movement of the pinion is accomplished without requiring any other means than herein disclosed.

When it is desired to operate the present device, the shaft 3 will be rotated by the starting motor in the usual manner, and this will cause the nut member and the casing to move lengthwise of the shaft. Likewise the pinion will be moved therewith by virtue of the intermediate spring 13. By virtue of the relative weight of the casing, it and the pinion will move in a straight line and will be practically free of rotary movement during such period of movement towards meshing engagement with the gear 1 of the motor.

When the nut has reached its limit of movement forwardly, it will engage the shock-absorbing device within the forward end of the casing, as above explained.

Should the teeth of the pinion not mesh properly with the teeth of the gear 1 but strike the edge of the same, the yielding action of the spring 13 and the spline connection between the pinion and casing will permit the pinion teeth to recede sufficiently to roll about the edge of the gear teeth so as to find their way into meshing engagement therewith.

Then with the pinion in proper meshing engagement with the motor gear 1, the casing and pinion will have reached their limit of advance movement and the starting device will then rotate as a unit with the shaft 3 and this motion will be transmitted to the motor gear 1. As soon as the motor begins to operate under its own power, the pinion will be rotated at the speed of the motor which exceeds that of the shaft 3 and will thus be forced to retreat from engagement with the gear by a reverse threading movement along the screw 3. Such retreating movement of the pinion causes the same together with the casing and nut member to return to the initial idle position indicated in Fig. 1.

Thus there is produced a comparatively simple construction involving few parts which are apt to get out of order and which can be manufactured at low cost and assembled in a quick and easy manner. This device possesses also a high degree of efficiency in its operation, as above explained, and the completely closed form of casing serves also to prevent the entrance of dirt to the operating parts. Thus, the life of the device is prolonged, and its dependability is increased. There is no danger of the parts sticking and the device is quiet in its operation.

What I claim is:

1. An engine starter device, comprising a starting pinion adapted to be moved axially into mesh with the gear of an engine to be started, a starting motor having a rotary shaft, a casing surrounding said shaft and having operative connection with said pinion, resilient means arranged between the outer end of the casing and the adjacent side of said pinion, means of operative connection between said shaft and casing for effecting axial movement of the pinion, and rubber cushion means arranged only partially along the shaft and within said casing and having fixed abutment upon the shaft near the end of the path of forward movement of said casing for co-operation with the said means of operative connection between said shaft and casing during only the final period of forward operation, said casing being otherwise free upon the inside thereof.

2. An engine starter device, comprising a starting pinion adapted to be moved axially into mesh with the gear of an engine to be started, a starting motor having a rotary shaft, screw means provided upon said shaft, a casing surrounding said screw means and having a nut member in engagement with said screw means, the front end of said casing having a hub-engaging portion, said pinion having a hub with a spline-like engagement with said hub-engaging portion, and a coil spring surrounding said spline connection and having bearing engagement at its ends with the casing and pinion so as to permit yieldable engagement of the pinion with the gear of the engine.

3. An engine starter device, comprising a starting pinion adapted to be moved axially into mesh with the gear of an engine to be started, a starting motor having a rotary shaft, screw means provided upon said shaft, a casing surrounding said screw means and having a nut member in engagement with said screw means, the front end of said casing having a hub-engaging portion, said pinion having a hub with a spline-like engagement with said hub-engaging portion, a coil spring surrounding said spline connection and having bearing engagement at its ends with the casing and pinion so as to permit yieldable engagement of the pinion with the gear of the engine, and rubber cushion means arranged within said casing in such manner as to be effective during only the final period of operation.

4. An engine starter device, comprising a starting pinion adapted to be moved axially into mesh with the gear of an engine to be started, a starting motor having a rotary shaft, screw means provided upon said shaft, a casing surrounding said screw means and having operative connection with said pinion and having means of screw-threaded engagement with said screw means so as to afford axial movement of said pinion, and resilient cushion means arranged only partially along said shaft and within said casing and having fixed abutment upon said shaft near the end of the path of forward movement of said casing for co-operation with said means of operative connection between said shaft and casing during only the final period of forward operation, said casing being otherwise free upon the inside thereof.

STEPHEN JENCICK.